(12) United States Patent
Johnson et al.

(10) Patent No.: US 7,623,320 B2
(45) Date of Patent: Nov. 24, 2009

(54) DISCRETE MOUNTING ARM FOR HARD DISK DRIVE AND METHOD FOR MAKING THE SAME

(75) Inventors: Richard Johnson, Goleta, CA (US); Kendall Kollmann, Santa Barbara, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 217 days.

(21) Appl. No.: 11/493,965

(22) Filed: Jul. 27, 2006

(65) Prior Publication Data

US 2008/0024931 A1 Jan. 31, 2008

(51) Int. Cl.
G11B 21/02 (2006.01)
G11B 5/48 (2006.01)

(52) U.S. Cl. .................................. 360/265.9

(58) Field of Classification Search ............ 360/265.9, 360/266, 266.1
See application file for complete search history.

(56) References Cited

U.S. PATENT DOCUMENTS

| | | | |
|---|---|---|---|
| 3,677,111 A | 7/1972 | Dragoo | |
| 5,126,904 A * | 6/1992 | Sakurai | 360/244.2 |
| 5,408,372 A * | 4/1995 | Karam, II | 360/244.2 |
| 5,588,200 A | 12/1996 | Schudel | |
| 5,677,815 A * | 10/1997 | Chan | 360/265.7 |
| 5,812,342 A * | 9/1998 | Khan et al. | 360/244.9 |
| 5,973,883 A * | 10/1999 | Yanagisawa | 360/244.9 |
| 6,359,755 B1 * | 3/2002 | Dietzel et al. | 360/244.3 |
| 6,519,115 B1 * | 2/2003 | Yaeger | 360/255.7 |
| 6,545,842 B2 * | 4/2003 | Rao et al. | 360/244.2 |
| 6,663,817 B1 | 12/2003 | Chang et al. | |
| 6,751,068 B1 * | 6/2004 | Kant et al. | 360/266 |
| 2002/0057536 A1 * | 5/2002 | Boutaghou et al. | 360/265.9 |
| 2002/0109943 A1 * | 8/2002 | Crane et al. | 360/244.3 |
| 2002/0186512 A1 * | 12/2002 | Kubotera et al. | 360/266 |
| 2006/0209456 A1 * | 9/2006 | Bisuwasu et al. | 360/97.02 |
| 2007/0002498 A1 * | 1/2007 | Zuo et al. | 360/266 |

FOREIGN PATENT DOCUMENTS

| | | | | |
|---|---|---|---|---|
| JP | 02031389 A | * | 2/1990 | |
| JP | 04047570 A | * | 2/1992 | |
| JP | 07274470 A | * | 10/1995 | |
| JP | 10027438 A | * | 1/1998 | |
| WO | WO 9909544 A1 | * | 2/1999 | |

* cited by examiner

*Primary Examiner*—William J Klimowicz

(57) ABSTRACT

A mounting arm for a hard disk drive having a generally planar region, the mounting arm having at least one striation formed on the generally planar region to provide compressive residual stress with desirable shape characteristics in the mounting arm.

15 Claims, 7 Drawing Sheets

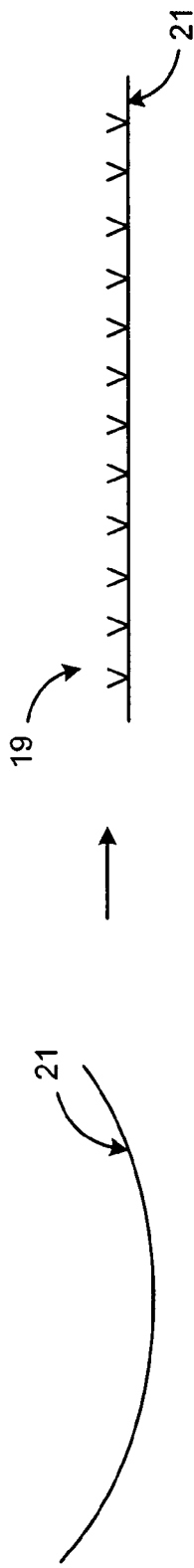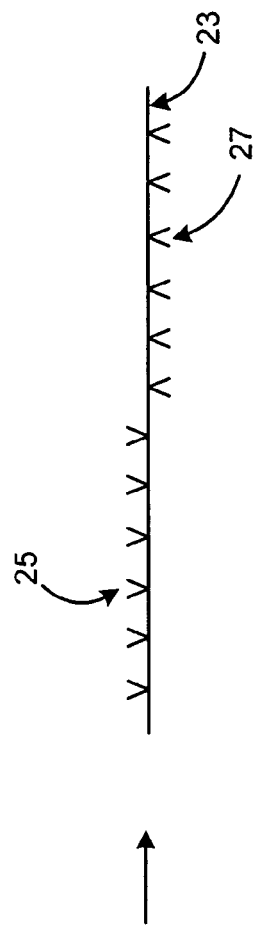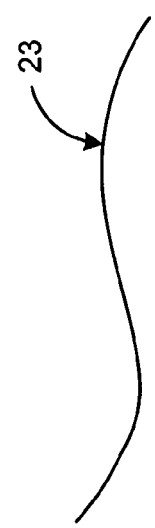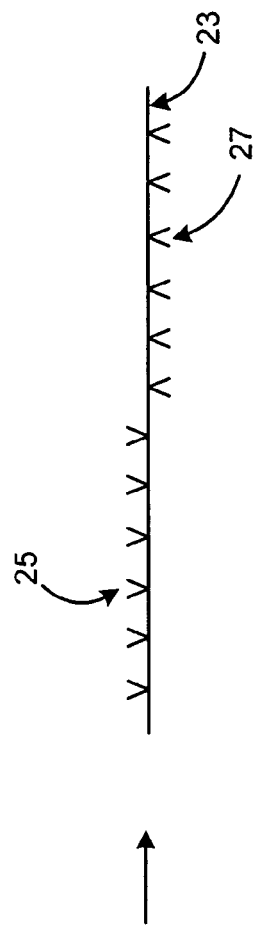

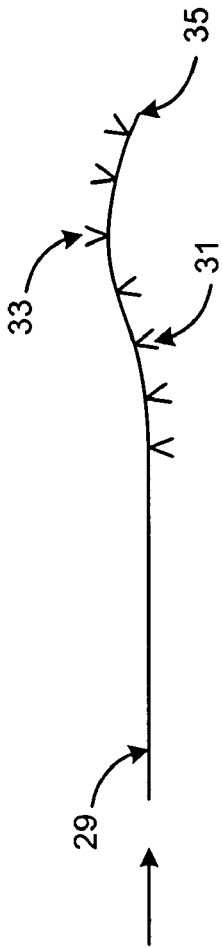
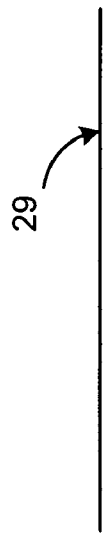
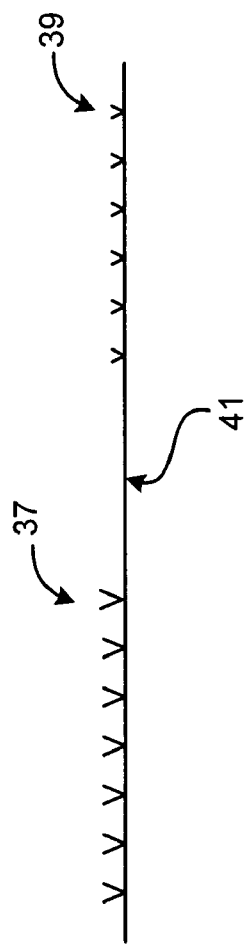
Figure 8
Figure 9
Figure 7

DISCRETE MOUNTING ARM FOR HARD DISK DRIVE AND METHOD FOR MAKING THE SAME

BACKGROUND OF THE INVENTION

1. Field of the Invention

The invention relates generally to a mounting arm for hard disk drives. More particularly, the invention relates to a mounting arm for hard disk drives with striations for counteracting residual stress, and method for making the same.

2. Description of Related Art

A key component of any computer system is a device to store data. One common place for storing massive amounts of data in a computer system is on a hard disk drive (HDD). The most basic parts of a disc drive are a disc that is rotated, a mounting arm, such as an actuator arm, that moves a transducer to various locations on the disc, and electrical circuitry that is used to write and read data to and from the disc. There are a variety of disc drives in use today, such as hard disc drives, zip drives, floppy disc drives. All utilize either rotary or linear mounting arms.

In hard disk drives, magnetic heads read and write data on the surfaces of rotating disks that are co-axially mounted on a spindle motor. The magnetically-written "bits" of information are laid out in concentric circular "tracks" on the surfaces of the disks. The disks must rotate quickly so that the computer user does not have to wait long for a desired bit of information on the disk surface to translate to a position under the head. In modern disk drives, data bits and tracks must be extremely narrow and closely spaced to achieve a high density of information per unit area of the disk surface.

The required small size and close spacing of information bits on the disk surface have consequences on the design of the disk drive device and its mechanical components. Among the most important consequences is that the magnetic transducer on the head must operate in extremely close proximity to the magnetic surface of the disk. Because there is relative motion between the disk surface and the magnetic head due to the disk rotation and head actuation, continuous contact between the head and disk can lead to tribological failure of the interface. Such tribological failure, known colloquially as a "head crash," can damage the disk and head, and usually cause data loss. Therefore, the magnetic head is designed to be hydrodynamically supported by an extremely thin air bearing so that its magnetic transducer can operate in close proximity to the disk while physical contact between the head and the disk is minimized or avoided. Typically, the head-to-disk spacing present during operation of modern hard disk drives is extremely small, measuring in the tens of nanometers.

The mounting arm is typically used to move a magnetic transducer in close proximity to a disc. It must be of a sufficiently high stiffness to withstand acceleration forces, vibration and mechanical shock occurring during operation of a disk drive. FIG. 1 illustrates a prior art mounting arm 10. The mounting arm 10 comprises a generally planar region 11 with an opening 12 for insertion of a pivot bearing cartridge. It has a cantilevered section 13 that couples, via a boss hole 14, to at least one suspension arm (not shown) at the distal end via laser welding. Attached to the suspension are recording heads/sliders which include magnetic transducers that magnetize the surface of the disk (not shown). The mounting arm 10 may carry two suspensions on opposite sides thereof to support two transducer heads in opposing directions, one up and one down. Typically, the mounting arm 10 has a length 20 of about 1.4 inches, a width 16 of about 0.20 inches, and a thickness of about 0.012 inches. The mounting arm 10 may be made from 300 Series stainless steel material, for example.

Characteristics of the mounting arm used for moving the magnetic transducer in close proximity to the disk must be considered by the designer to minimize vibration in response to rapid angular motions and other excitations. For example, the mounting arm must be stiff enough and the mounting pivot bearing must be of high enough quality so that the position of the head can be precisely controlled during operation. Also, the interface between the mounting arm and the pivot bearing must be of sufficient rigidity and strength to enable precise control of the head position during operation and to provide the boundary conditions necessary to facilitate higher natural resonant frequencies of vibration of the mounting arm. The stiffness of the mounting arm must also be sufficient to limit deflection that might cause contact with the disk during mechanical shock events.

The mounting arm is typically made from full hard 300 series stainless steel strip. The stainless steel is tension leveled to relieve any abnormalities in the residual stress within the material resulting in a state optimized for flat stamping. Regardless of the incoming stress state, the effect of cutting an irregular periphery from the raw material is one that yields a characteristic shape that is rarely the desired shape. Consequently, die forming is employed to counteract the post-edge cut shape and add any desired shape.

To force full hard stainless steel to take a desired shape, over-bending is required. This over-bending requires shaped tooling that is difficult to manufacture, expensive and only applicable to a given raw material lot. Once the incoming material changes, the required punch shape will be different to compensate for the changes. This requires frequent tooling changes, which is cost prohibitive.

Most state-of-the-art fabrication attempts to improve the incoming residual stress condition of the raw material have had limited short term success. Conventional EDM shaped punches that are typically used in the industry have limited short term success. Optimizing cutting clearances to minimize distortion through stamping has also been attempted. Matching punch shapes of a presumed best shape have also been tried. All these fabrication methods fail to achieve the result of shifting the shape of the mounting arm with small variation or have the ability to adjust the fabrication method quickly and easily.

Therefore, there is a need in the art for a mounting arm with improved residual stress condition by providing localized compressive stress zones, easily applied to the mounting arm, to adjust the shape of the mounting arm.

SUMMARY OF THE INVENTION

A mounting, arm for a hard disk drive with improved residual stress, the mounting arm having a generally planar region, with striations formed on the planar region to provide localized compressive residual stress with desirable shape characteristics in the mounting arm. The striations may be formed by applying a serrated punch to the mounting arm. The striations may be aligned parallel to the width or length of the mounting arm, or diagonally across the length of the mounting arm. They may be fully or partially formed along the width or length of the mounting arm. The striations may be formed on both sides of the mounting arm. They may be loosely or tightly spaced. Each striation may have a different depth with different compressive strength. The striations may be used to manipulate the shape of the mounting arm.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 3 is a diagram illustrating pre-compression of a mounting arm with deflection from mechanical shocks.

FIG. 4 is a diagram illustrating post-compression of a mounting arm with compression zones on one side, according to the present invention.

FIG. 5 is a diagram illustrating pre-compression of a mounting arm with S-shaped deflection.

FIG. 6 is a diagram illustrating post-compression of a mounting arm with compression zones on both sides, according to the present invention.

FIG. 7 is a diagram illustrating pre-compression of a mounting arm with no deflection or deformation.

FIG. 8 is a diagram illustrating post-compression of a mounting arm with desirable bending characteristics, according to the present invention.

FIG. 9 is a diagram illustrating compression zones of different compressive strength on a mounting arm, according to the present invention.

DETAILED DESCRIPTION OF THE PREFERRED EMBODIMENTS

Due to stamping and raw material influences, the resulting shape of a mounting arm is rarely a desirable one. This is due to the relaxation of residual stress from cutting and stresses imparted during cutting. To counteract the undesirable shape, localized compressive stress zones are formed on the mounting arm to adjust the shape of the mounting arm.

Figure 1:
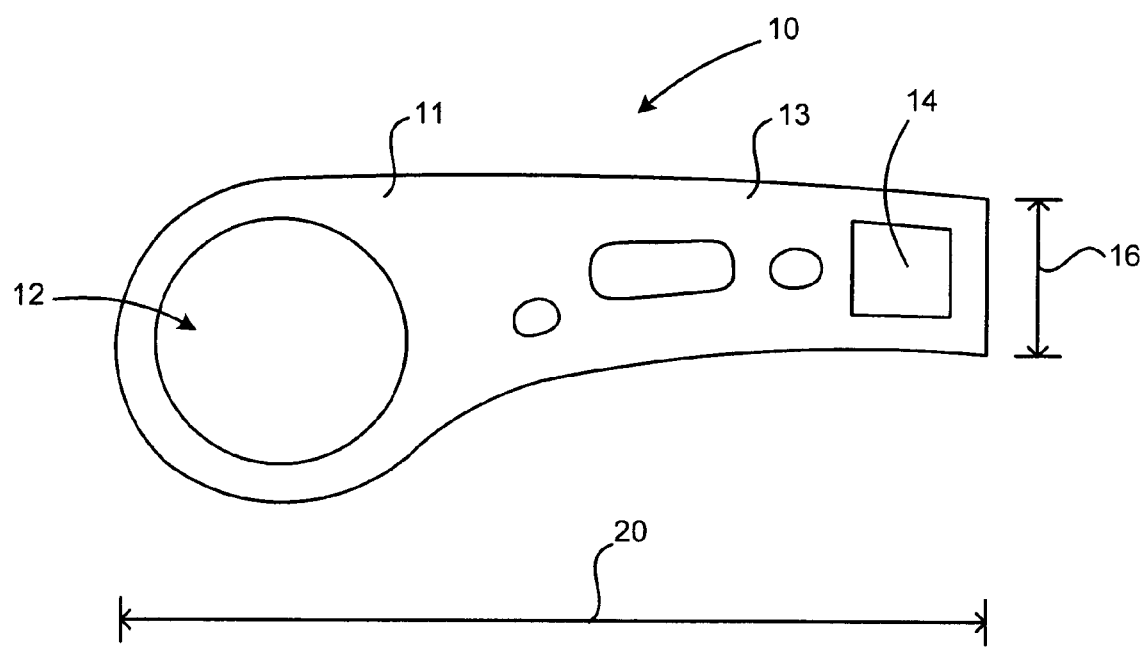
FIG. 1 is a top view of a prior art mounting arm.
Figure 2:
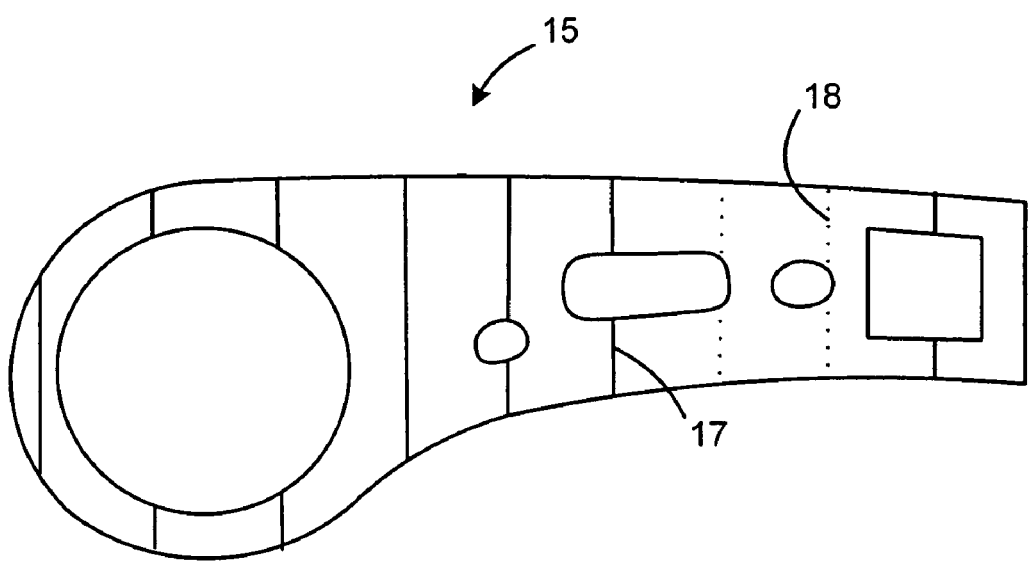
FIG. 2 is a top view of a mounting arm, according to the present invention.

FIG. 2 illustrates a mounting arm 15 with compression zones 17 that are aligned parallel to the width of the mounting arm 15.

With the mounting arm 15 on a flat punch, a serrated punch can be pressed down on the top side with a controlled force and/or displacement. The serrations on the punch have peaks that impart enough stress and strain in the material of the mounting arm to cause plastic deformation. This results in compression zones 17 with depressions or striations formed along the serrations of the punch. The depressions are preferably about 20 μin deep and can have a variable width and length. As shown in FIG. 2, the compression zones 17 are formed across the mounting arm 15 or may be a plurality of depression points 18 along a straight or curved path. The depression points 18 are formed by a plurality of serrated peaks on the punch.

The depression and compressive stress residual from its creation, bows the mounting arm 15 away from the serration. FIG. 2 illustrates multiple compression zones 17 formed from reciprocal multiple serrations on a punch. The number, orientation and spacing of the compression zones 17 depend on the configuration of the serrations of the punch. The serrations can be configured to have any shape or height. The serrated punch can be pressed on a mounting arm 15 to create deep depressions, and then the serration tips are ground off to varying heights, which can be done one at a time, in order to get a different amount of compression-induced deflection along the length or width of the mounting arm 15. This eliminates the need to create a matching punch for the opposite side. Alternatively, serrations may be used on punches on either side, as shown in FIGS. 6, 8, 12 and 13.

Different configurations and orientations can be used to provide desirable compression zones in specific locations on the mounting arm. For example, FIGS. 3 and 4 illustrate pre-compression and post-compression of a mounting arm 21 with compression zones 19 on the concave side. FIG. 3 is an exaggerated view of the mounting arm 21 to show how it is deflected or bent due to relaxation of residual stress due to cutting and stresses imparted during cutting. FIG. 4 illustrates compression zones 19 on one side of the mounting arm 21 to counteract the undesirable shape. Multiple serrations can be used to create a bow along the mounting arm 21 to counteract a bow in the opposite direction on the post-compression mounting arm 21. Accordingly, the mounting arm 21 becomes properly shaped and maintains its structural strength and integrity.

FIGS. 5 and 6 illustrate pre-compression and post-compression of a mounting arm 23 with compression zones on both sides. FIG. 5 is an exaggerated view of a mounting arm 23 that has an S-shaped deflection or bending due to relaxation of residual stress due to cutting and stresses imparted during cutting. FIG. 6 illustrates compression zones 25 on the top side and compression zones 27 on the bottom side of the mounting arm 23 to counteract its undesirable shape. The mounting arm 23 with specifically placed compression zones 25 and 27 corrects the S-shaped deformation.

While compression zones can be used to counteract an undesirable shape through plastic deformation of the mounting arm, compression zones can also be used to configure the mounting arm with desirable shape characteristics. For example, FIGS. 7 and 8 illustrate pre-compression and post-compression of a mounting arm 29 with desirable shape characteristics. FIG. 7 depicts the mounting arm 29 having an initially flat shape. FIG. 8 illustrates compression zones 31 and 33 partially formed on opposite sides of the mounting arm 29 to manipulate the shape of the mounting arm 29. This results in a mounting arm 29 with a desirable structural characteristic at the tip 35.

FIG. 9 illustrates a mounting arm 41 having compression zones 37 and 39 of different compression depths. Accordingly, the mounting arm 41 bends more in some areas 37 than in others 39 and maintains its structural strength and integrity in operation.

Figure 10:
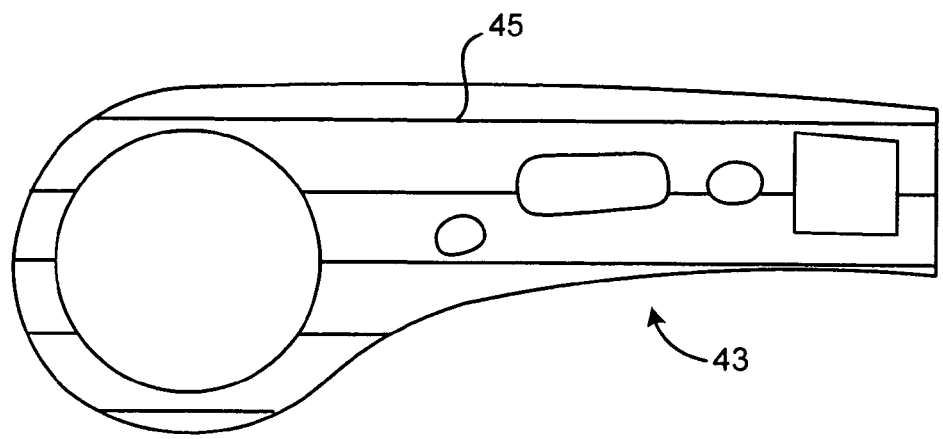
FIG. 10 is a top view of a mounting arm, according to the present invention.
Figure 11:
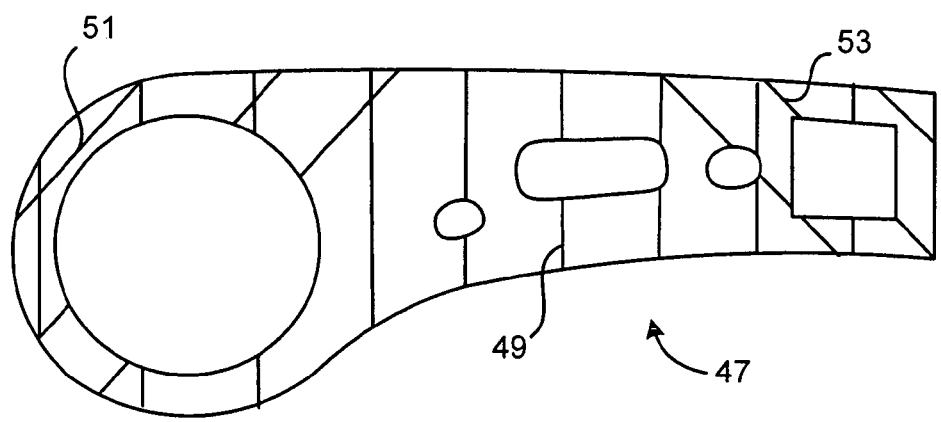
FIG. 11 is a top view of a mounting arm, according to the present invention.

The number, orientation and spacing of compression zones will depend on the characteristics of the localized compressive stress residual in the mounting arm. For example, as shown in FIG. 2, the mounting arm 15 has compression zones 17 parallel to the width of the mounting arm 15. FIG. 10 shows a mounting arm 43 with compression zones 45 parallel to the length of the mounting arm 43. FIG. 11 shows a mounting arm 47 with compression zones 49, 51 and 53 having multiple orientations. In FIG. 11, compression zones 49 are parallel to the width of the mounting arm 47, while compression zones 51 and 53 are diagonal, across the length of the mounting arm 47. Diagonal compression zones 51 and 53 are used to provide bracing to the mounting arm 47 for added stiffness and/or to configure the mounting arm 47 with a desirable structural characteristic.

Figure 12:
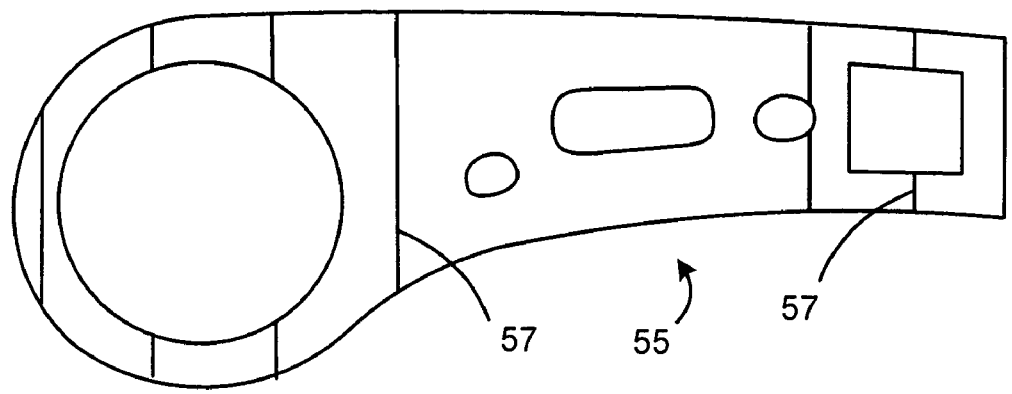
FIG. 12 is a top view of a mounting arm illustrating compression zones on both sides of a mounting arm, according to the present invention.
Figure 13:
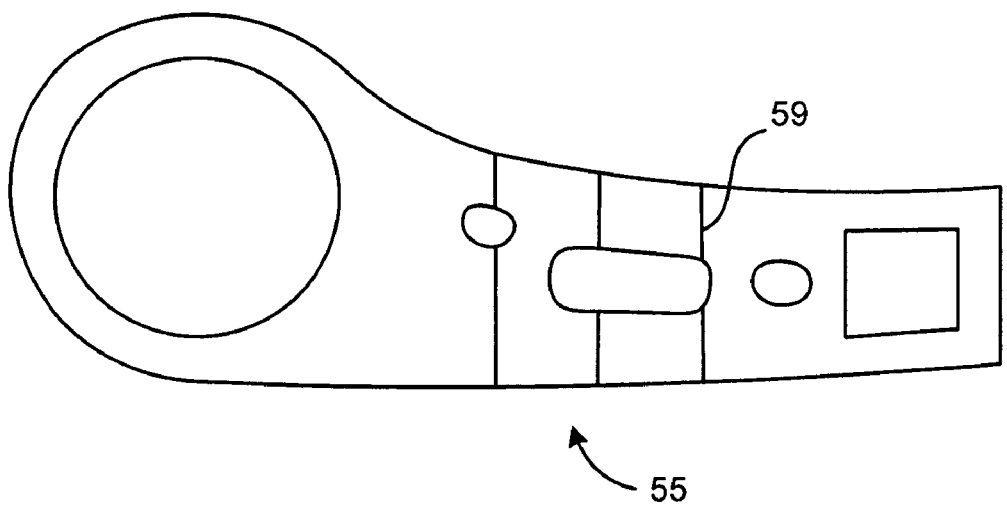
FIG. 13 is a bottom view of a mounting arm illustrating compression zones on both sides of an mounting arm, according to the present invention.

FIGS. 12 and 13 illustrate the use of compression zones on both sides of a mounting arm 55. Compression zones can be fully or partially formed on the mounting arm 55. Furthermore, compression zones can be formed on opposite sides of the mounting arm 55 so that the compression zones on opposite sides do not align. FIG. 12 shows compression zone 57 partially formed on the top surface of the mounting arm 55 along its entire length. FIG. 13 shows compression zone 59 partially formed on the bottom surface of the mounting arm 55 with no compression zone on the opposite top surface.

The number of and spacing between the compression zones depends on the shape characteristics desired. Tightly spaced compression zones provide greater bending than loosely spaced ones. Similarly, the greater the number of compression zones used, the greater the compressive stress residual in the mounting arm for configuring the mounting arm with desirable shape characteristics.

Figure 14:
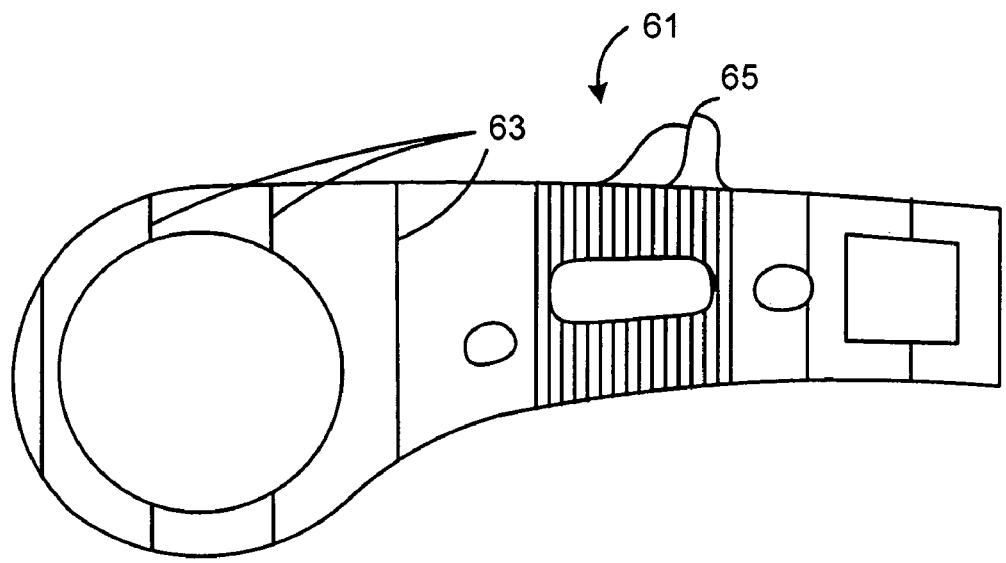
FIG. 14 is a top view of a mounting arm with variable gaps between the compression zones.

FIG. 14 illustrates a top view of a mounting arm 61 with variable gaps between the compression zones. Compression zones 63 are loosely spaced, on the other hand, compression zones 65 are tightly spaced, placing a greater number of compression zones in an area. Accordingly, compression zones 65 provide greater bending than compression zones 63.

Figure 15:
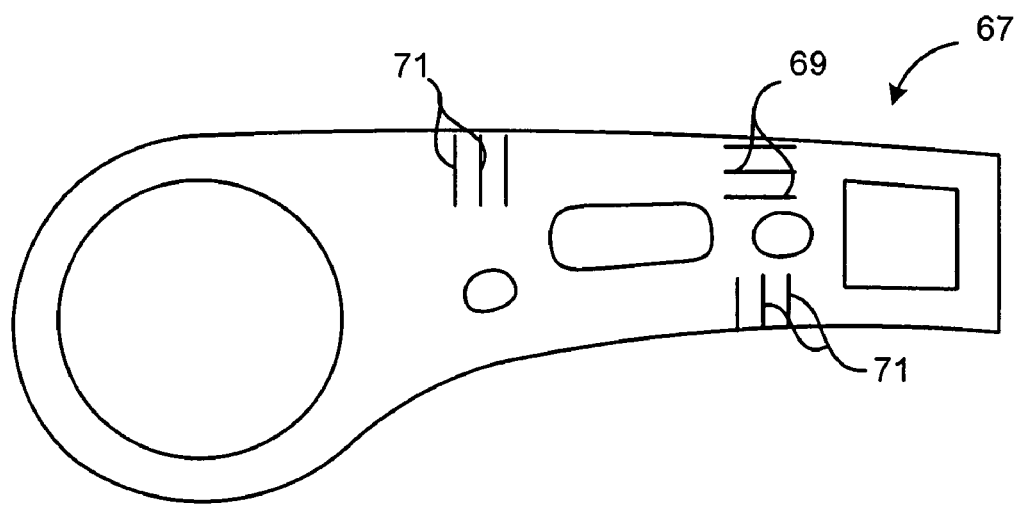
FIG. 15 is a top view of a mounting arm with compression zones of partial width and/or length.

FIG. 15 illustrate a mounting arm 67 with compression zones of partial width and/or length. The mounting arm 67 can have compression zones 69 using a partial length of the mounting arm 67 and compression zones 71 using a partial width of the mounting arm 67. This arrangement adjusts for twist by providing added bending to the mounting arm 67.

While certain exemplary embodiments have been described and shown in the accompanying drawings, it is to be understood that such embodiments are merely illustrative of a mounting arm for a hard disk drive having a generally planar region, and a plurality of compression zones formed on the generally planar region to provide compressive residual stress in the mounting arm.

What is claimed is:

1. A mounting arm for a magnetic transducer used in a hard disk drive, the mounting arm having a generally planar region formed out of stainless steel, the mounting arm being shaped by a plurality of non co-linear striations on the planar region caused by plastic deformation of the planar region by depressions formed in a surface of the planar region that is about 20μ inches deep, the mounting arm tending to bow away from the surface containing the striations, thereby modifying the shape or hardness of the mounting arm.

2. The mounting arm of claim 1, wherein the one or more striations are parallel to the width of the mounting arm.

3. The mounting arm of claim 1, wherein the one or more striations are parallel to the length of the mounting arm.

4. The mounting arm of claim 1, wherein the one or more striations are diagonal to the length of the mounting arm.

5. The mounting arm of claim 1, wherein the one or more striations are formed diagonal to the width of the mounting arm.

6. The mounting arm of claim 1, wherein the one or more striations are formed as depression points along the width of the mounting arm.

7. The mounting arm of claim 1, wherein the one or more striations are formed on both sides of the mounting arm.

8. The mounting arm of claim 1, wherein the one or more striations have different depth.

9. The mounting arm of claim 1, wherein the one or more striations are loosely spaced.

10. The mounting arm of claim 1, wherein the one or more striations are tightly spaced.

11. The mounting arm of claim 1, wherein the one or more striations are depression points on the mounting arm.

12. The mounting arm of claim 1, wherein the one or more striations are partially formed along the length of the mounting arm.

13. The mounting arm of claim 1, wherein the one or more striations are partially formed along the width of the mounting arm.

14. The mounting arm of claim 1, wherein the striations have a variable width.

15. The mounting arm of claim 1, wherein the striations have a variable length.

* * * * *